US012039052B2

(12) United States Patent
Fujii

(10) Patent No.: US 12,039,052 B2
(45) Date of Patent: Jul. 16, 2024

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Takashi Fujii, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 177 days.

(21) Appl. No.: 17/718,572

(22) Filed: Apr. 12, 2022

(65) Prior Publication Data
US 2022/0342996 A1 Oct. 27, 2022

(30) Foreign Application Priority Data

Apr. 21, 2021 (JP) ................. 2021-072073

(51) Int. Cl.
G06F 21/57 (2013.01)
G06F 21/64 (2013.01)
G06F 21/73 (2013.01)
G06F 21/78 (2013.01)

(52) U.S. Cl.
CPC ............ G06F 21/575 (2013.01); G06F 21/64 (2013.01); G06F 21/73 (2013.01); G06F 21/78 (2013.01)

(58) Field of Classification Search
CPC ....... G06F 21/44–45; G06F 21/57–575; G06F 21/60–602; G06F 21/64–645; G06F 21/73; G06F 21/78
See application file for complete search history.

(56) References Cited

U.S. PATENT DOCUMENTS

2018/0285127 A1* 10/2018 Shang ................... G06F 21/575
2022/0207145 A1* 6/2022 Young ................... G06F 21/575

FOREIGN PATENT DOCUMENTS

JP 2016206861 A 12/2016
JP 2019133220 A 8/2019
JP 2019153050 A 9/2019

* cited by examiner

Primary Examiner — Kevin Bechtel
(74) Attorney, Agent, or Firm — ROSSI, KIMMS & McDOWELL LLP

(57) ABSTRACT

The present invention provides an information processing apparatus and a method of controlling the information processing apparatus. The information processing apparatus comprises a first storage that stores a boot program, and a second storage that stores hardware configuration information of the information processing apparatus. At activation of the information processing apparatus, the information processing apparatus verifies a validity of the hardware configuration information stored in the second storage by executing the boot program, and in a case that the validity of the hardware configuration information is verified, the information processing apparatus adds unique information that depends on an individual of the information processing apparatus by executing the boot program to the hardware configuration information of the second storage.

12 Claims, 3 Drawing Sheets

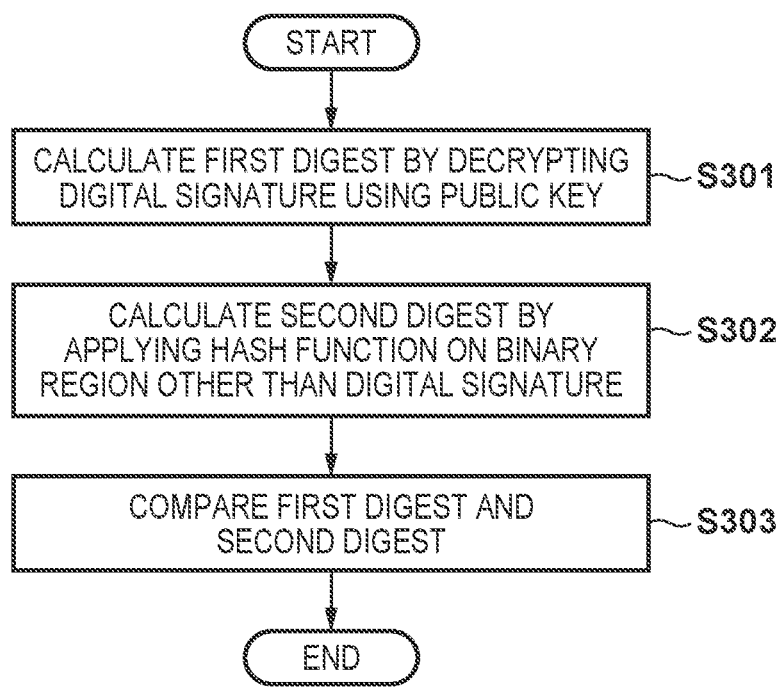

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus and a method of controlling the same, and a storage medium.

Description of the Related Art

The base addresses and allocation sizes of peripheral devices to be used by an OS (operation system) are respectively determined according to the specifications of each peripheral device and boards mounted on the peripheral devices. For example, in Linux™ kernel for ARM™, a method for describing hardware information called a Device Tree is defined, and a boot program is configured to notify the OS of the Device Tree.

In recent years, the risk of devices with built-in firmware, including information processing apparatuses, being subjected to firmware falsification attacks by attackers has increased. For this reason, recent information processing apparatuses are provided with a function of verifying the validity of firmware at activation and, if it is determined that the firmware is not valid, preventing the information processing apparatus from operating.

At activation, the validity of a Device Tree, which is hardware configuration information, must be verified to prevent attacks that combine a "malicious program" and "maliciously mounted hardware".

A variety of items of hardware configuration information are described in the Device Tree. In hardware configuration information, there are common information and unique information for each of the individual devices. CPU information, bus connection information, clock information, and the like are common hardware configuration information, MAC addresses and the like are unique information for each of the individual devices. Therefore, a different Device Tree ends up being held for each of the individual devices, and a signature necessary to verify the validity of the information needs to be created for each of the individual devices.

Japanese Patent Laid-Open No. 2016-206861 describes notifying a security manager when a security policy inputted to an information processing apparatus cannot be adhered to using a security function implemented on the information processing apparatus. Japanese Patent Laid-Open No. 2019-133220 describes that, in an information processing apparatus in which various configurations may be taken, an expected value of integrity assurance information is automatically acquired, rather than by a user's manual operation, and the expected value is registered in a PCR (Platform Configuration Register) for the configurations that may be taken. Further, Japanese Patent Laid-Open No. 2019-153050 stores second individual information which can identify a second activation device in which the second activation information to be used when an information processing apparatus is activated is stored. It is described that when an information processing apparatus is to be activated using first activation information stored in a first activation device, if the first individual information acquired from the first activation device is not stored, the activation of the information processing apparatus is stopped.

In order to create a signature necessary for verifying the validity of the information described above for each of the individual devices, a digital signature that differs for each of the individual devices needs to be created. For example, in a production process, a network chip needs to be mounted on a substrate, a MAC address needs to be determined, and MAC address information needs to be described in the Device Tree of each of the individual devices to create a Device Tree signature. However, when a digital signature is created in the production process, a private key needs be passed to a production base that is overseas or the like. When there are a plurality of production bases, private keys need to be provided to the plurality of production bases; the risk of leakage is increased due to there being a plurality of routes over which the private keys are provided; therefore, it is desirable to avoid, as much as possible, providing private keys.

SUMMARY OF THE INVENTION

An aspect of the present invention is to eliminate the above-mentioned problem with conventional technology.

A feature of the present invention is to provide a technique by which it is possible to avoid the risk of leakage of a private key by handling the private key only at a development base and making it unnecessary to handle it at a production base.

According to a first aspect of the present invention, there is provided an information processing apparatus comprising: a first storage that stores a boot program a second storage that stores hardware configuration information of the information processing apparatus; and at least one processor and at least one memory configured to: at activation of the information processing apparatus, verify a validity of the hardware configuration information that has been stored in the second storage by executing the boot program; and in a case that the validity of the hardware configuration information is verified, add unique information that depends on an individual of the information processing apparatus by executing the boot program to the hardware configuration information of the second storage.

According to a second aspect of the present invention, there is provided a method of controlling an information processing apparatus having a first storage that stores a boot program and a second storage that stores hardware configuration information of the information processing apparatus, the method comprising: at activation of the information processing apparatus, verifying a validity of the hardware configuration information that has been stored in the second storage by executing the boot program; and in a case that the validity is verified in the verifying, adding unique information that depends on an individual of the information processing apparatus by executing the boot program to the hardware configuration information of the second storage.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart for explaining an overview of verification processing of the information processing apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
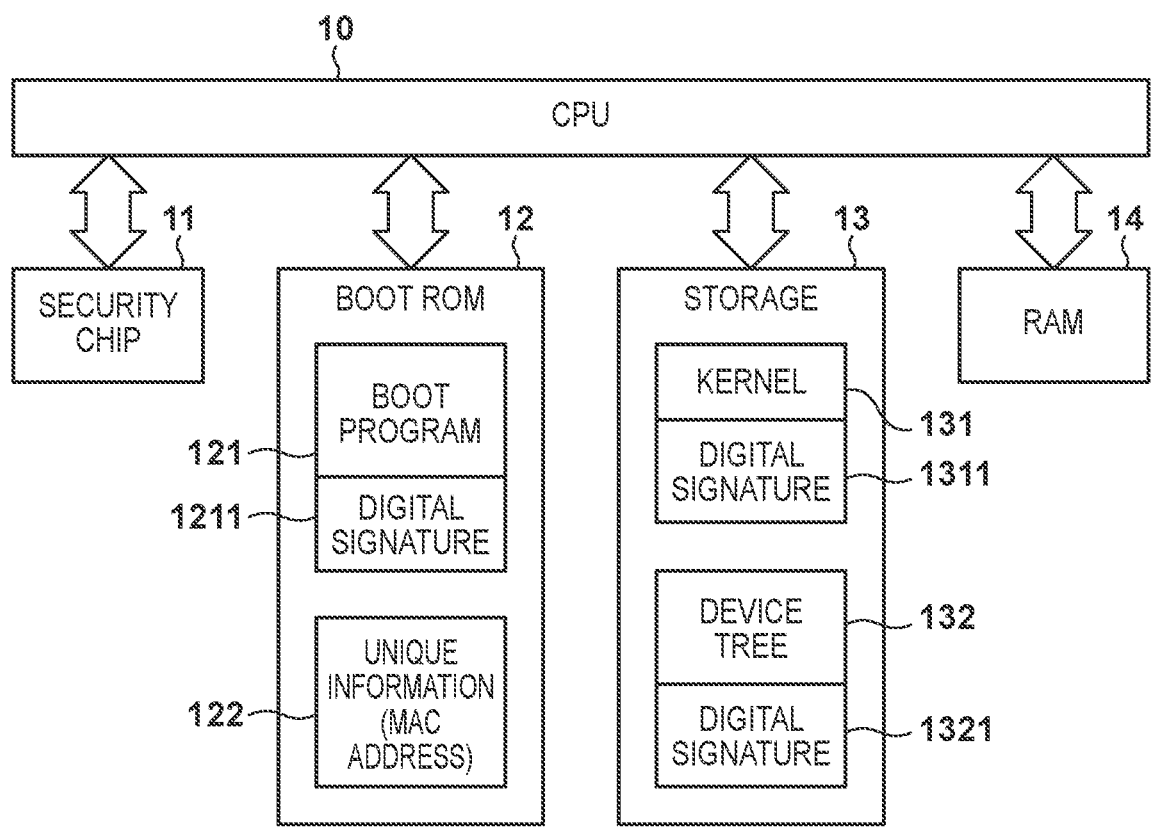
FIG. 1 is a block diagram for describing a configuration of the main components of an information processing apparatus according to an embodiment of the present invention.

FIG. 1 is a block diagram for describing a configuration of the main components of an information processing apparatus according to an embodiment of the present invention.

The information processing apparatus includes a CPU (Central Processing Unit) 10, a security chip 11, a boot ROM (Read Only Memory) 12, a storage 13, and a RAM (Random Access Memory) 14. The CPU 10 is a central processing computation unit for executing various programs and controls the entire information processing apparatus. The security chip 11 internally holds key information for verifying a digital signature and includes a function for verifying a digital signature 1211 of a boot program at activation of the information processing apparatus. The boot ROM 12 is a read-only storage apparatus that stores a boot program 121 to be used for when activating the information processing apparatus and the digital signature 1211 thereof.

The storage 13 includes a kernel 131 and a digital signature 1311 thereof, a Device Tree 132, and a non-volatile storage area storing a digital signature 1321. The storage 13 can be realized by, for example, an eMMC (embedded MMC), a hard disk, a solid-state drive, or the like. The kernel 131 performs control, scheduling, and the like of various resources. The Device Tree 132 is property information of hardware used by the kernel 131. The digital signatures 1211, 1311, and 1321 are data encrypted by a public key encryption algorithm using private keys generated by a key generation algorithm for digests calculated from the boot program 121, the kernel 131, and the Device Tree 132, respectively. For example, a SHA-1 algorithm and the like are adopted to generate digests. The RAM 14 is a memory for storing temporary information when the CPU 10 operates various programs.

Figure 2:
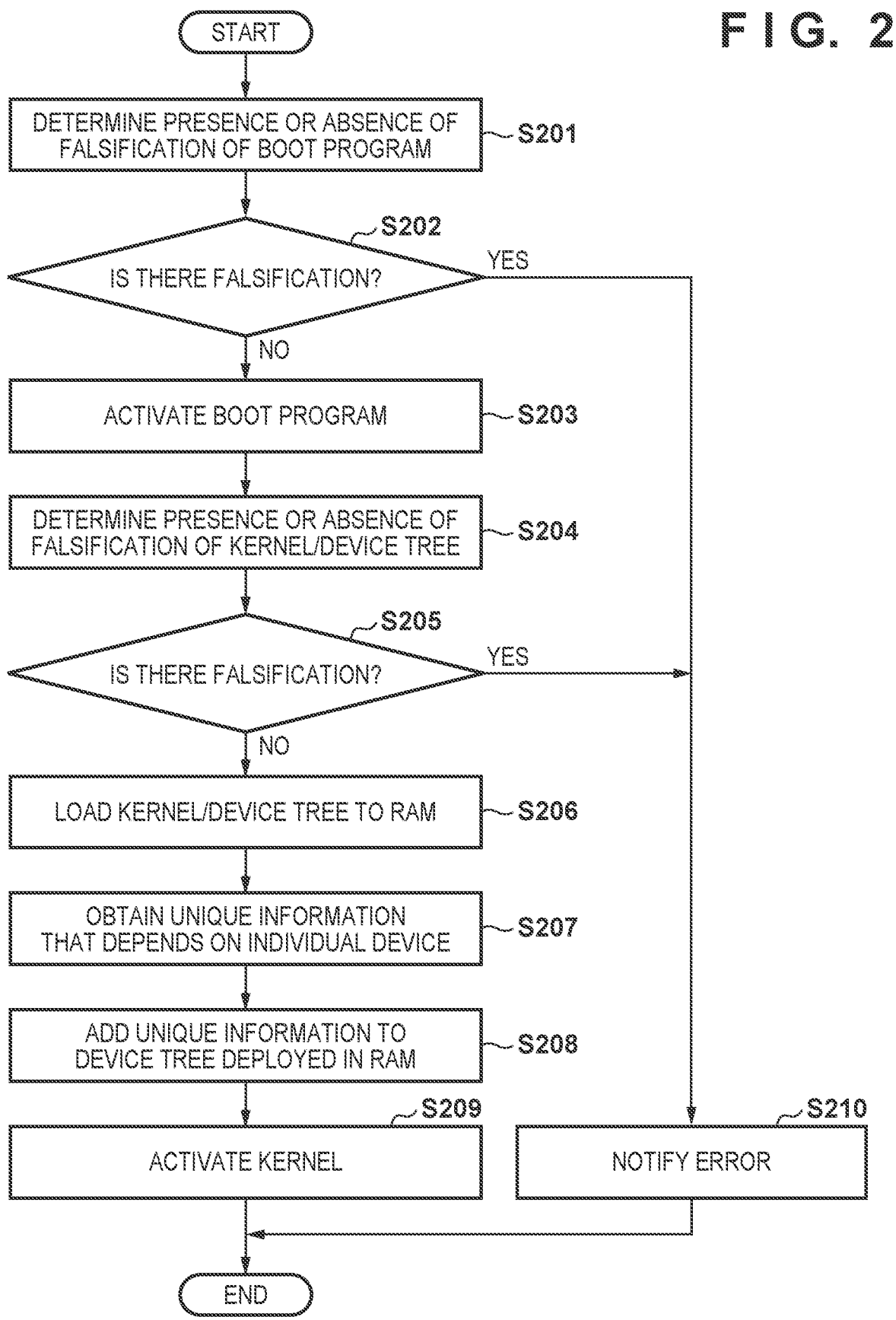
FIG. 2 is a flowchart for explaining an overview of activation processing of the information processing apparatus according to the embodiment.

FIG. 2 is a flowchart for explaining an overview of activation processing of the information processing apparatus according to the embodiment. The processing described in this flowchart is accomplished by the CPU 10 executing a program which has been deployed in the RAM 14.

When the information processing apparatus is powered on, in step S201, the CPU 10 first activates the security chip 11. Once the security chip 11 is activated, the verification processing for the boot program 121 stored in the boot ROM 12 is performed using the digital signature 1211. Next, the process proceeds to step S202, and the CPU 10 determines by the verification processing whether or not the boot program 121 has been falsified. If it is determined that the boot program 121 has not been falsified and is valid, the process proceeds to step S203. On the other hand, when it is determined in step S202 that the boot program 121 has been falsified and is not normal, the CPU 10 advances the process to step S210.

In step S203, the CPU 10 loads the boot program 121 into the RAM 14 and activates the boot program 121. In step S204, the CPU 10 performs, with the boot program 121, the verification processing of the kernel 131 and the Device Tree 132 stored in the storage 13 using the digital signatures 1311 and 1321. Then, the process proceeds to step S205, and the CPU 10 determines by the verification processing whether the kernel 131 and the Device Tree 132 are valid, that is, whether they have been falsified. If it is determined that the kernel 131 and the Device Tree 132 are not falsified and are normal, the process proceeds to step S206; otherwise, the process proceeds to step S210 described above.

In step S206, the CPU 10 executing the boot program 121 loads the kernel 131 and the Device Tree 132 determined to be normal from the storage 13 into the RAM 14. Then, the process proceeds to step S207, and the CPU 10 executing the boot program 121 obtains, from the boot ROM 12, unique information 122 that depends on the individual device. Here, the unique information 122 that depends on the individual device is, for example, a MAC address, and is written to the boot ROM 12 in the production process. The, the process proceeds to step S208, and the CPU 10 executing the boot program 121 adds the unique information 122 that depends on the individual device obtained in step S207 to the Device Tree 132 loaded in the RAM 14. The, the process proceeds to step S209, and the CPU 10 executing the boot program 121 starts executing the kernel 131 loaded into the RAM 14. If it is determined that the boot program 121, the kernel 131, and the Device Tree 132 are not normal, in step S210, a start failure error is notified, the subsequent processing is not executed, and the activation of the information processing apparatus is stopped.

FIG. 3 is a flowchart for explaining an overview of verification processing of the information processing apparatus according to the embodiment. This flowchart is detail of the process of determining the presence or absence of falsification performed in steps S201 and S204 of FIG. 2.

First, in step S301, the CPU 10 calculates a first digest by decrypting, in the case of the boot program 121, the digital signature 1211 and, in the case of the kernel 131 and the Device Tree 132, the digital signatures 1311 and 1321 using a public key. This public key decryption processing can be applied to decryption algorithms of various public key cryptosystems, such as Elliptic Curve Cryptography and RSA Cryptography (RSA cryptosystem). Next, the process proceeds to step S302, and the CPU 10 calculates a second digest for a binary region (the boot program 121 for the digital signature 1211, the kernel 131 corresponding to the digital signature 1311, and the Device Tree 132 corresponding to the digital signature 1321) other than the digital signature. The algorithm used to generate this second digest is the same as that used for when generating digital signatures 1211, 1311, and 1321. Next, the process proceeds to step S303, and the CPU 10 compares the first digest obtained in step S301 with the second digest obtained in step S302. When these coincide, it is determined in the subsequent determination process (step S202, step S205) that there is no falsification.

As described above, according to the information processing apparatus of the embodiment, avoiding the hardware configuration information being dependent on the individual devices and configuring the hardware configuration information to be common to the devices makes it unnecessary to create a digital signature for each of the individual devices. By this, it becomes unnecessary to transfer private keys to each production base, making it possible to avoid the risk of leakage of key information.

Note that this embodiment is one example for explaining the present invention, and the present invention is not limited to this configuration. For example, although the Device Tree used in Linux™ kernel for ARM™ has been described as an example in the present embodiment, a unit that is not the Device Tree may be used as a unit for performing transmission to the OS of a memory area mounted on the controller board. For example, a configuration may be taken so as to use an ACPI (Advanced configuration and Power Interface) table, an E820 map, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-72073, filed Apr. 21, 2021, which is hereby incorporated by reference herein in its entirety.

What is claimed is:

1. An information processing apparatus comprising:
a first storage that stores a boot program;
a second storage that stores hardware configuration information of the information processing apparatus; and
at least one processor and at least one memory configured to execute the boot program to:
at activation of the information processing apparatus, verify a validity of the hardware configuration information that has been stored in the second storage; and
in a case that the validity of the hardware configuration information is successfully verified, (i) obtain the hardware configuration information stored in the second storage, (ii) obtain unique information that depends on an individual device of the information processing apparatus and that was stored before the validity of the hardware configuration information is successfully verified, and (iii) add the unique information, that depends on the individual device of the information processing apparatus and that was stored before the validity of the hardware configuration information is successfully verified, to the obtained hardware configuration information that was successfully verified.

2. The information processing apparatus according to claim 1, wherein the at least one processor and the at least one memory are further configured to:
verify the validity of the boot program that is stored in the first storage.

3. The information processing apparatus according to claim 2, wherein the at least one processor and the at least one memory are further configured to:
execute the verification of the validity of the boot program using a security chip.

4. The information processing apparatus according to claim 1, wherein the first storage is read-only.

5. The information processing apparatus according to claim 1, wherein the first storage is read-only, and the unique information is obtained from the first storage.

6. The information processing apparatus according to claim 5, wherein the unique information is stored in the first storage in a production process of the information processing apparatus.

7. The information processing apparatus according to claim 1, wherein in the verification of the validity of the hardware configuration information, verification processing of a kernel and a device tree that are stored in the second storage is performed using a corresponding digital signature.

8. The information processing apparatus according to claim 7, wherein the at least one processor and the at least one memory are further configured to:
in the addition of the unique information, add the unique information to the device tree.

9. The information processing apparatus according to claim 1, wherein the second storage is a readable and writable non-volatile storage.

10. The information processing apparatus according to claim 1, wherein the unique information includes a MAC address.

11. A method of controlling an information processing apparatus having a first storage that stores a boot program and a second storage that stores hardware configuration information of the information processing apparatus, the method comprising:
at activation of the information processing apparatus, executing the boot program and verifying a validity of the hardware configuration information that has been stored in the second storage; and
in in response to the validity of the hardware configuration information being successfully verified in the verifying, (i) obtaining the hardware configuration information stored in the second storage, (ii) obtaining unique information that depends on an individual device of the information processing apparatus and that was stored before the validity of the hardware configuration information is successfully verified, and (iii) adding the unique information, that depends on the individual device of the information processing apparatus and that was stored before the validity of the hardware configuration information is successfully verified, to the obtained hardware configuration information that was successfully verified.

12. A non-transitory computer-readable storage medium storing a program for causing a processor to execute a method of controlling an information processing apparatus having a first storage that stores a boot program and a second storage that stores hardware configuration information of the information processing apparatus, the method comprising:

at activation of the information processing apparatus, executing the boot program and verifying a validity of the hardware configuration information that has been stored in the second storage; and in a case that the validity of the hardware configuration information is successfully verified in the verifying, (i) obtaining the hardware configuration information stored in the second storage, (ii) obtaining unique information that depends on an individual device of the information processing apparatus and that was stored before the validity of the hardware configuration information is successfully verified, and (iii) adding the unique information, that depends on ac the individual device of the information processing apparatus and that was stored before the validity of the hardware configuration information is successfully verified, to the obtained hardware configuration information that was successfully verified.

\* \* \* \* \*